(12) United States Patent
Carreira et al.

(10) Patent No.: US 12,067,732 B2
(45) Date of Patent: Aug. 20, 2024

(54) NEURAL NETWORK SYSTEMS FOR DECOMPOSING VIDEO DATA INTO LAYERED REPRESENTATIONS

(71) Applicant: DeepMind Technologies Limited, London (GB)

(72) Inventors: Joao Carreira, St Albans (GB); Jean-Baptiste Alayrac, London (GB); Andrew Zisserman, London (GB)

(73) Assignee: DeepMind Technologies Limited, London (GB)

( * ) Notice: Subject to any disclaimer, the term of this patent is extended or adjusted under 35 U.S.C. 154(b) by 458 days.

(21) Appl. No.: 17/295,321

(22) PCT Filed: Nov. 20, 2019

(86) PCT No.: PCT/EP2019/081876
§ 371 (c)(1),
(2) Date: May 19, 2021

(87) PCT Pub. No.: WO2020/104498
PCT Pub. Date: May 28, 2020

(65) Prior Publication Data
US 2022/0012898 A1    Jan. 13, 2022

Related U.S. Application Data

(60) Provisional application No. 62/770,092, filed on Nov. 20, 2018.

(51) Int. Cl.
*G06T 7/215* (2017.01)
*G06F 18/214* (2023.01)
(Continued)

(52) U.S. Cl.
CPC ............ *G06T 7/215* (2017.01); *G06F 18/214* (2023.01); *G06N 3/045* (2023.01); *G06N 3/049* (2013.01);
(Continued)

(58) Field of Classification Search
None
See application file for complete search history.

(56) References Cited

U.S. PATENT DOCUMENTS

2017/0230675 A1* 8/2017 Wierstra ................ G06N 3/047
2019/0035113 A1* 1/2019 Salvi ...................... G06N 3/084

OTHER PUBLICATIONS

Piergiovanni et al ("Unseen Action Recognition With Multimodal Learning", https://arxiv.org/abs/1806.08251v2, published Oct. 1, 2018, pp. 1-17, retrieved from the Internet on Oct. 23, 2023) (Year: 2018).*

(Continued)

*Primary Examiner* — Leon Viet Q Nguyen
(74) *Attorney, Agent, or Firm* — Fish & Richardson P.C.

(57) ABSTRACT

A computer-implemented neural network system for decomposing input video data. A video data input receives a sequence of video image frames. The sequence is encoded, using a 3D spatio-temporal encoder neural network, into a set of latent variables representing a compressed version of the sequence. A 3D spatio-temporal decoder neural network processes the set of latent variables to generate two or more sets of decomposed video data; these may be stored, communicated, and/or made available to a user interface. Input video including undesired features such as reflections, shadows, and occlusions may thus be decomposed into two or more video sequences, one in which the undesired features are suppressed, and another containing the undesired features.

17 Claims, 8 Drawing Sheets

(51) Int. Cl.
G06N 3/045 (2023.01)
G06N 3/049 (2023.01)
G06N 3/084 (2023.01)
(52) U.S. Cl.
CPC .... *G06N 3/084* (2013.01); *G06T 2207/10016* (2013.01); *G06T 2207/20081* (2013.01); *G06T 2207/20084* (2013.01)

(56) References Cited

OTHER PUBLICATIONS

Carreira et al ("Quo Vadis, Action Recognition? A New Model and the Kinetics Dataset", Proceedings of the IEEE Conference on Computer Vision and Pattern Recognition (CVPR), 2017, pp. 6299-6308, retrieved from the Internet on Oct. 25, 2023) (Year: 2017).*
Afouras et al., "The Conversation: Deep Audio-Visual Speech Enhancement," CoRR, Apr. 2018, arxiv.org/abs/1804.04121, 5 pages.
Barron et al., "Fast Fourier Color Constancy," Proceedings of the IEEE Conference on Computer Vision and Pattern Recognition, 2017, pp. 886-894.
Barron et al., "Shape, Illumination, and Reflectance from Shading," IEEE Transactions on Pattern Analysis and Machine Intelligence, Aug. 2015, 37(8):1670-1687.
Barron, "Convolutional Color Constancy," Proceedings of the IEEE International Conference on Computer Vision, 2015, pp. 379-387.
Beery et al., "Blind Separation of Superimposed Shifted Images Using Parameterized Joint Diagonalization," IEEE Transactions on Image Processing, Mar. 2008, 17(3):340-353.
Carreira et al., "A short note about kinetics-600," CoRR, Aug. 2018, arXiv:1808.01340, 6 pages.
Carreira et al., "Human pose estimation with iterative error feedback," Proceedings of the IEEE conference on computer vision and pattern recognition, 2016, pp. 4733-4742.
Carreira et al., "Quo vadis, action recognition? A new model and the kinetics dataset," Proceedings of the IEEE Conference on Computer Vision and Pattern Recognition, 2017, pp. 6299-6308.
Chi et al., "Single Image Reflection Removal Using Deep Encoder-Decoder Network," CoRR, Jan. 2018, arxiv.org/abs/1802.00094, 10 pages.
Cho et al., "Removing non-uniform motion blur from images," 2007 IEEE 11th International Conference on Computer Vision, Oct. 2007, 8 pages.
Dumoulin et al., "A guide to convolution arithmetic for deep learning," CoRR, Mar. 2016, arxiv.org/abs/1603.07285, 31 pages.
Ephrat et al., "Looking to Listen at the Cocktail Party: a Speaker-Independent Audio-Visual Model for Speech Separation," CoRR, Apr. 2018, arxiv.org/abs/1804.03619, 11 pages.
Fan et al., "A Generic Deep Architecture for Single Image Reflection Removal and Image Smoothing," Proceedings of the IEEE International Conference on Computer Vision, 2017, pp. 3238-3247.
Fan et al., "Revisiting Deep Intrinsic Image Decompositions," Proceedings of the IEEE Conference on Computer Vision and Pattern Recognition, 2018, pp. 8944-8952.
Fergus et al., "Removing camera shake from a single photograph," SIGGRAPH '06: ACM SIGGRAPH, Jul. 2006, pp. 787-794.
Finlayson et al., "Intrinsic Images by Entropy Minimization," European Conference on Computer Vision, 2004, pp. 582-595.
Firman et al., "Diversenet: When one right answer is not enough," Proceedings of the IEEE Conference on Computer Vision and Pattern Recognition, 2018, pp. 5598-5607.
Gai et al., "Blind Separation of Superimposed Moving Images Using Image Statistics," IEEE Transactions on Pattern Analysis and Machine Intelligence, Jan. 2012, pp. 19-32.
Guo et al., "Robust Separation of Reflection from Multiple Images," Proceedings of the IEEE Conference on Computer Vision and Pattern Recognition, 2014, pp. 2187-2194.
Inoue, "Data Augmentation by Pairing Samples for Images Classification," CoRR, Jan. 2018, arxiv.org/abs/1801.02929, 8 pages.
Kay et al., "The kinetics human action video dataset," CoRR, May 2017, arXiv:1705.06950, 22 pages.
Kim et al., "Deep Blind Video Decaptioning by Temporal Aggregation and Recurrence," CoRR, May 2019, arxiv.org/abs/1905.02949, 10 pages.
Kumar et al., "Learning layered motion segmentations of video," International Journal of Computer Vision, Jul. 2007, 76(3):301-319.
Li et al., "Interactive image segmentation with latent diversity," Proceedings of the IEEE Conference on Computer Vision and Pattern Recognition, 2018, pp. 577-585.
Liu-Yin et al., "Better together: Joint reasoning for non-rigid 3D reconstruction with specularities and shading," CoRR, Aug. 2017, arXiv:1708.01654, 13 pages.
Mathieu et al., "Deep multi-scale video prediction beyond mean square error," CoRR, Nov. 2015. arxiv.org/abs/1511.05440, 14 pages.
Nandoriya et al., "Video Reflection Removal Through Spatio-Temporal Optimization," Proceedings of the IEEE International Conference on Computer Vision, 2017, pp. 2411-2419.
Newell et al., "Stacked hourglass networks for human pose estimation," European Conference on Computer Vision, Sep. 2016, pp. 483-499.
Owens et al., "Audio-visual scene analysis with self-supervised multisensory features," Proceedings of the European Conference on Computer Vision, 2018, pp. 631-648.
PCT International Preliminary Report on Patentability in International Appln. No. PCT/EP2019/081876, dated Jun. 3, 2021, 8 pages.
PCT International Search Report and Written Opinion in International Appl. No. PCT/EP2019/081876, dated Apr. 24, 2020, 9 pages.
Piergiovanni et al., "Learning Multimodal Representations for Unseen Activities," CoRR, Jun. 2018, arxiv.org/abs/1806.08251, 15 pages.
Ronneberger et al., "U-Net: Convolutional Networks for Biomedical Image Segmentation," CoRR, May 2015, arXiv:1505.04597, 8 pages.
Rupprecht et al., "Learning in an UncertainWorld: Representing Ambiguity Through Multiple Hypotheses," Proceedings of the IEEE International Conference on Computer Vision, 2017, pp. 3591-3600.
Shan et al., "High-quality motion deblurring from a single image," ACM Transactions on Graphics, Aug. 2008, 27(3):1-0.
Sinha et al., "Recovering Reflectance and Illumination in aWorld of Painted Polyhedra," 1993 4th International Conference on Computer Vision, May 1993, pp. 156-163.
Szeliski et al., "Layer extraction from multiple images containing reflections and transparency," Proceedings IEEE Conference on Computer Vision and Pattern Recognition, CVPR 2000, Cat. No.PR00662, Jun. 2000, 1:246-253.
Tappen et al., "Recovering Intrinsic Images from a Single Image," IEEE Transactions on Pattern Analysis and Machine Intelligence, Sep. 2005, 27(9):1459-1472.
Tokozume et al., "Between-class Learning for Image Classification," Proceedings of the IEEE Conference on Computer Vision and Pattern Recognition, 2018, pp. 5486-5494.
Ummenhofer et al., "DeMoN: depth and motion network for learning monocular stereo," Proceedings of the IEEE Conference on Computer Vision and Pattern Recognition, 2017, pp. 5038-5047.
Wang et al., "Representing moving images with layers," IEEE Transactions on Image Processing, Sep. 1994, 3(5):625-638.
Weiss, "Deriving intrinsic images from image sequences," Proceedings Eighth IEEE International Conference on Computer Vision, Aug. 2002, 8 pages.
Whyte et al., "Non-uniform deblurring for shaken images," International Journal of Computer Vision, Oct. 2011, 98(2):168-186.
Xue et al., "A Computational Approach for Obstruction-Free Photography," ACM Transactions on Graphics, Jul. 2015, 34(4):1-1.
Yu et al., "Permutation Invariant Training of Deep Models for Speaker-Independent Multi-talker Speech Separation," 2017 IEEE International Conference on Acoustics, Speech and Signal Processing, Mar. 2017, 5 pages.
Yuan et al., "Image deblurring with blurred/noisy image pairs," SIGGRAPH '07: ACM SIGGRAPH, Jul. 2007, 10 pages.

(56) References Cited

OTHER PUBLICATIONS

Zhang et al., "Colorful image colorization," European Conference on Computer Vision, Sep. 2016, 29 pages.

Zhang et al., "Mixup: Beyond empirical risk minimization," CoRR, Oct. 2017, arxiv.org/abs/1710.09412, 13 pages.

Zolfaghari et al., "Chained multi-stream networks exploiting pose, motion, and appearance for action classification and detection," Proceedings of the IEEE International Conference on Computer Vision, 2017, pp. 2904-2913.

* cited by examiner

NEURAL NETWORK SYSTEMS FOR DECOMPOSING VIDEO DATA INTO LAYERED REPRESENTATIONS

CROSS-REFERENCE TO RELATED APPLICATION

This application is a National Stage Application under 35 U.S.C. § 371 and claims the benefit of International Application No. PCT/EP2019/081876, filed Nov. 20, 2019, which claims priority to U.S. Application No. 62/770,092, filed Nov. 20, 2018, entitled NEURAL NETWORK SYSTEMS FOR DECOMPOSING VIDEO DATA, the disclosure of which is incorporated herein by reference.

BACKGROUND

This specification relates to computer-implemented neural network systems for decomposing video data, in particular into two or more layered representations.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. Some neural networks are convolutional neural networks which learn parameters of local filters defining feature maps to generate the output.

SUMMARY

This specification describes a system, which may be implemented as one or more computer programs on one or more computers in one or more locations, that processes video data using neural networks. The processed video data may ultimately be derived from a video camera or other video image generating device such as a LIDAR system, but may be input to the system from data storage or over a network.

In implementations the processing decomposes input video data into two or more sets of decomposed video data, one which represents reconstructed video and one or more others which represent unwanted features such as reflections, shadows, a color of illuminating light, and the like. The sets of decomposed video data may be referred to as layered representations of the input video data.

In one aspect there is therefore provided a computer-implemented neural network system for processing input video data representing input video image frames to decompose the input video data into two or more sets of decomposed video data each representing a respective sequence of decomposed video image frames, the sequences of decomposed video image frames representing a decomposition of the input video image frames. The neural network system may comprise a video data input to receive a sequence of input video image frames. The neural network system may further comprise a predictor 3D spatio-temporal encoder neural network to encode the sequence of input video image frames into a first set of latent variables representing a compressed version of the input video image frames. The neural network system may further comprise a predictor 3D spatio-temporal decoder neural network to receive and process the first set of latent variables to generate two or more sets of decomposed video data representing respective sequences of decomposed video image frames. The neural network system may further comprise a video data output to output video data derived from one or more of the sets of decomposed video data. This data may be output, for example, to a data store, communications network, and/or user interface.

Thus in implementations an input video including one or more undesired features such as reflections, shadows, occlusions and the like may be decomposed into two (or more) sequences of video image frames, one containing the undesired features the other containing video image frames in which the undesired features are suppressed or removed. Thus in some implementations only one of the sets of decomposed video data is needed. In other implementations both sequences of decomposed video image frames may contain useful information, and both may be retained.

In some implementations the system inputs a batch of video data representing the sequence of input video image frames and outputs one or more batches of video data derived from one or more of the sets of decomposed video data. Thus the system may operate offline. In other implementations the system may operate online, in a streaming mode. For example the system may process batches of video data sequentially, with an output delay corresponding to the batch duration. In another streaming mode the system may start by processing a first batch of video data for a first time segment, to provide corresponding output video data, and thereafter may output video frames one at a time. In this latter mode the system may retain some intermediate computation results, for example so as not to have to fully re-compute convolutions or optical flow (see later).

In implementations the encoder and decoder neural networks are termed predictor neural networks because they form part of a system which predicts the video decomposition e.g. the reconstructed video without the undesired features.

The neural network system may further comprise a corrector 3D spatio-temporal encoder neural network, coupled to an output of the predictor 3D spatio-temporal decoder neural network. The corrector 3D spatio-temporal encoder neural network is configured to receive each of the sets of decomposed video data and to encode the respective sequences of decomposed video image frames into a second set of latent variables representing a compressed version of the sequences of decomposed video image frames. The neural network system may further comprise a corrector 3D spatio-temporal decoder neural network to receive and process the second set of latent variables to generate two or more sets of correction video data, that is, a set of correction video data for each set of decomposed video data. The neural network system may further comprise a combiner to combine each set of decomposed video data with a respective set of correction video data to provide two or more sets of combined video data. The video output data may then comprise one or more of the sets of combined video data. The combiner may comprise a summer to add set of decomposed video data to a respective set of correction video data.

In implementations the combination of the corrector 3D spatio-temporal encoder neural network and corrector 3D spatio-temporal decoder neural network acts as a corrector neural network system. Thus the corrector neural network system may take the sets of decomposed video data from the predictor 3D spatio-temporal decoder neural network and apply a correction to improve the decomposition. The data from the different sets of decomposed video data from the predictor may be mixed and recombined in the corrector neural network system, to provide a correction to the sets of decomposed video data from the predictor to improve the decomposition in the output video data. The predictor neural networks and corrector neural network system may be trained end-to-end as described later.

In some implementations the system includes multiple, i.e. chained, corrector neural network systems to apply successive corrections to the sets of decomposed video data from the predictor to improve the decomposition in the output video data. Thus each of the corrector neural network systems may be configured to provide a set of correction video data for each set of decomposed video data. The combiner may be configured to combine, e.g. sum, each set of decomposed video data with a respective set of correction video data from each of the corrector neural network systems.

In some implementations the encoder and decoder neural networks are 3D spatio-temporal neural networks because they process 3D spatio-temporal data, that is data with two spatial dimensions and a time dimension, although in principle more (or fewer) spatial dimensions could be present. In this context different color channels, where present, are not considered additional dimensions as such.

In some implementations the 3D spatio-temporal encoder neural network comprises a 3D convolutional neural network. This may be similar to a 2D convolutional neural network in which the 2D filters (kernels) have been inflated to 3D by endowing them with an additional temporal dimension. The receptive field in the time dimension may, for example, be chosen according to the task so as to approximately match growth in time (with increasing depth within the network) with motion in space of features within the images. That is, the "motion" of features in time as captured by a 3D convolution filter may approximately match the motion of features in the video. This may be achieved, for example, by adjusting the stride in time and/or pooling. For example there may be spatial pooling but no temporal pooling in one or more lower (closer to the input) layers of the 3D spatio-temporal encoder neural network.

In some implementations an optical flow image determination system is included to determine a sequence of optical flow image frames from the sequence of input video image frames, in some implementations an optical flow image frames for each input video image frame (apart, potentially from a first and/or last input video image frame). This may implement any suitable technique, e.g. a differential technique based on local and/or global first and optionally second derivatives of pixel values with respect to time and/or x- and y-displacement, or a TV-L1 algorithm (total variation flow field regularization, $L^1$ norm for data fidelity). An optical flow image may comprise, for example a set of x- and y-pixel displacement values for each pixel location. Alternatively, for example, it may comprise x- and y-components of a vector mapping motion of a pixel from one frame to one or more later frames. The optical flow may be unidirectional, either forwards or backwards, or bi-directional. Optionally a global, e.g. mean, motion estimation component may be subtracted to compensate for global motion. Then the predictor 3D spatio-temporal encoder neural network may comprise a pair of convolutional neural networks, a first convolutional neural network to process the sequence of input video image frames and a second convolutional neural network to process the sequence of optical flow image frames; and a combiner to combine outputs from the first and second convolutional neural networks to provide the first set of latent variables. Each of the first and second convolutional neural networks may comprise a 3D spatio-temporal convolutional neural network.

In some implementations the predictor 3D spatio-temporal decoder neural network comprises a 3D de-convolutional neural network, for example configured to implement a series of transposed convolutions. The predictor 3D spatio-temporal decoder neural network may have a multichannel output such that the sets of decomposed video data are provided by different channels of the multichannel output. Thus the two or more sets of decomposed video data may be outputs are from same layer of the decoder neural network. This can help maintain internal consistency between the different sequences of decomposed video image frames.

In some implementations the predictor 3D spatio-temporal encoder neural network and the predictor 3D spatio-temporal decoder neural network each include a plurality of neural network layers and one or more skip (or residual) connections between neural network layers of corresponding resolution. The architecture of the combined predictor 3D spatio-temporal encoder and decoder neural networks may be similar to the U-Net neural network architecture, described by O. Ronneberger et al. in "U-Net: Convolutional Networks for Biomedical Image Segmentation", arXiv: 1505.04597 (although there may be one or more fully-connected layers).

In some implementations the predictor 3D spatio-temporal decoder neural network is configured to generate three or more sets of decomposed video data. This can help to produce better decompositions if the best two are selected. Thus there may be included an output selection system to automatically select two of the sets of decomposed video data for the output video data.

In this context the "best" two may be, for example, the two sequences of decomposed video image frames which are most different from (distant to) one another. Thus the output selection system may be configured to determine a difference metric between the sets of decomposed video data, and to select for output the two sets of decomposed video data with the greatest mutual difference metric. For example the output selection system may determine the difference metric for each possible combination of the sets of decomposed video data. The difference metric may be any suitable metric, for example based upon the inverse of any of many video similarity metrics; optionally it may operate in a video embedding space in which may it may comprise, for example, a dot product metric, or a Euclidean distance, between the embeddings.

In another aspect there is provided a method of (unsupervised) training of the neural network system. The method may comprise generating a training data set comprising a plurality of training videos by, for each of the training videos, combining different first and second videos e.g. with randomly selected relative weights. The training data set may be enhanced by random spatial and/or temporal cropping and/or flipping and the like. The method may further comprise providing the training data set to the neural network system to generate output video data comprising two of the sets of decomposed video data. The method may further comprise training the neural network system by adjusting parameters of the neural networks using a permutation invariant loss function.

In some implementations the permutation invariant optimization function is dependent upon a reconstruction loss. The reconstruction loss may define, for each training video, a difference between the sets of decomposed video data and the first and second videos. The reconstruction loss may be invariant as to which of the first and second videos is reconstructed by which set of decomposed video data.

The training may comprise backpropagating gradients of the loss function through the neural network system to update values (i.e. weights) of the neural network parameters. The training may be performed end-to-end, including one or more of the corrector neural network systems where implemented.

The permutation invariant loss function may comprise a minimum, over the sets of decomposed video data (i.e. with respect to permutation of the first and second videos), of the sum of a first term and a second term. The first term may represent a difference between the first video and one of the sets of decomposed video data; the second term may represent a difference between the second video and a different one of the sets of decomposed video data. For example the training loss may be as described later; the particular reconstruction loss described later is not essential. This general form of loss may be applied where there are two, three or more sets of decomposed video data provided by the neural network system. In some implementations the reconstruction loss includes a term representing a difference between spatial gradients in corresponding video image frames of compared videos, i.e. between a frame of the decomposed video data and a frame of whichever one of the first and second videos it is compared with. This can help to distinguish videos by placing weight on edge-type features, which may be harder to distinguish than regional features.

There is also provided a method of processing input video data representing input video image frames to decompose the input video data into two or more sets of decomposed video data each representing a respective sequence of decomposed video image frames, the sequences of decomposed video image frames representing a decomposition of the input video image frames. The method may comprise receiving a sequence of input video image frames. The method may further comprise encoding the sequence of input video image frames using a predictor 3D spatio-temporal encoder neural network, into a first set of latent variables representing a compressed version of the input video image frames. The method may further comprise processing the first set of latent variables using a predictor 3D spatio-temporal decoder to generate two or more sets of decomposed video data representing respective sequences of decomposed video image frames. The method may further comprise providing output video data derived from one or more of the sets of decomposed video data.

The subject matter described in this specification can be implemented in particular embodiments so as to realize one or more of the following advantages.

The neural network systems described herein can be used to improve the quality of, or restore, video data by removing undesired video features, for example reflections, shadows, lighting, occlusions and the like. They can also be used for color correction. This is because a video with a color tint decomposes into a first sequence of video frames comprising the color-corrected video and a second sequence of video frames comprising essentially just the removed color tint (and essentially no spatial features). Some implementations of the system can be trained unsupervised, using unlabeled training data (although this does not preclude the use of labelled training data). There are many applications of the systems and methods described to cleaning or editing video data, for example to remove artifacts from videos caused by colored windows, dirty mirrors, smoke, rain, shadows, clouds and so forth. The techniques may also be used to reconstruct portions of video frames temporarily occluded by another object. This may be used to "rescue" a video which might otherwise by difficult or expensive to capture again. Implementations of the system also have similar applications in cleaning video employed by robots, self-driving land, air or sea vehicles, or mechanical agents in general. Whilst in many instances the video may be captured from a camera, the systems and methods described may also be applied to video data from other image sensors such as LIDAR. The systems and methods described may also be applied to scientific, medical, and other video data.

In implementations the systems and methods described may be more useful than other techniques because they are more generally applicable, that is unlike previous techniques they do not rely on very specific assumptions regarding the video data to be processed such as a degree or type of motion, and they may produce fewer artefacts in their output video. In implementations the systems and methods described may be able to decompose, and hence improve, video in situations where other approaches perform less well, because the described techniques may use both motion within a video sequence and semantic content of the sequence to determine the decomposed video image frames. Thus the systems and methods described may be able to restore video better and/or faster than previous systems, and hence may be able to restore video with reduced memory and/or processing requirements.

In some cases the systems and methods described may succeed where other approaches fail, e.g. video which includes people or other objects moving around, and video which has been captured by a shaky video camera. Thus, for example, implementations of the systems and methods described may be used to improve the robustness of perceptual front-ends for safety critical systems operating in complex environments e.g. for robots or autonomous vehicles.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the drawings indicate like elements.

DETAILED DESCRIPTION

This specification generally describes a neural network system for decomposing input video data into two or more sets of decomposed video data. The sets of decomposed video data may be considered to define layered representations of the input video data, for example one layer representing cleaned or reconstructed video and another layer representing factored out features such as unwanted shadows, reflections and the like.

The input video data may comprise a sequence of images derived from any source, real or artificial. In some applications the input video data may be derived from a visible light camera or LIDAR sensor; in others the images may represent non-visible images, such as infrared, ultraviolet, radio, or X-ray images or images derived from other than light e.g. neutron images; or synthetic images constructed from multiple different types of sensors. The images may be derived, for example, from a robot or autonomous or semi-autonomous vehicle, or from a scientific instrument or apparatus e.g. a microscope or telescope.

The video decomposition may be used to process the sequence of images to remove unwanted features or enhance the visibility of a useful part of the video. Such unwanted features may include reflections, shadows, effects resulting from imaging through a colored or dirty window, smoke or rain, and effects due to colored lighting. Sometimes, for example in the case of reflections, a scene may include multiple objects with independent motions. Alternatively the video decomposition may be used to discover features, information, or video layers the presence of which might be difficult to detect or unsuspected.

Figure 1:
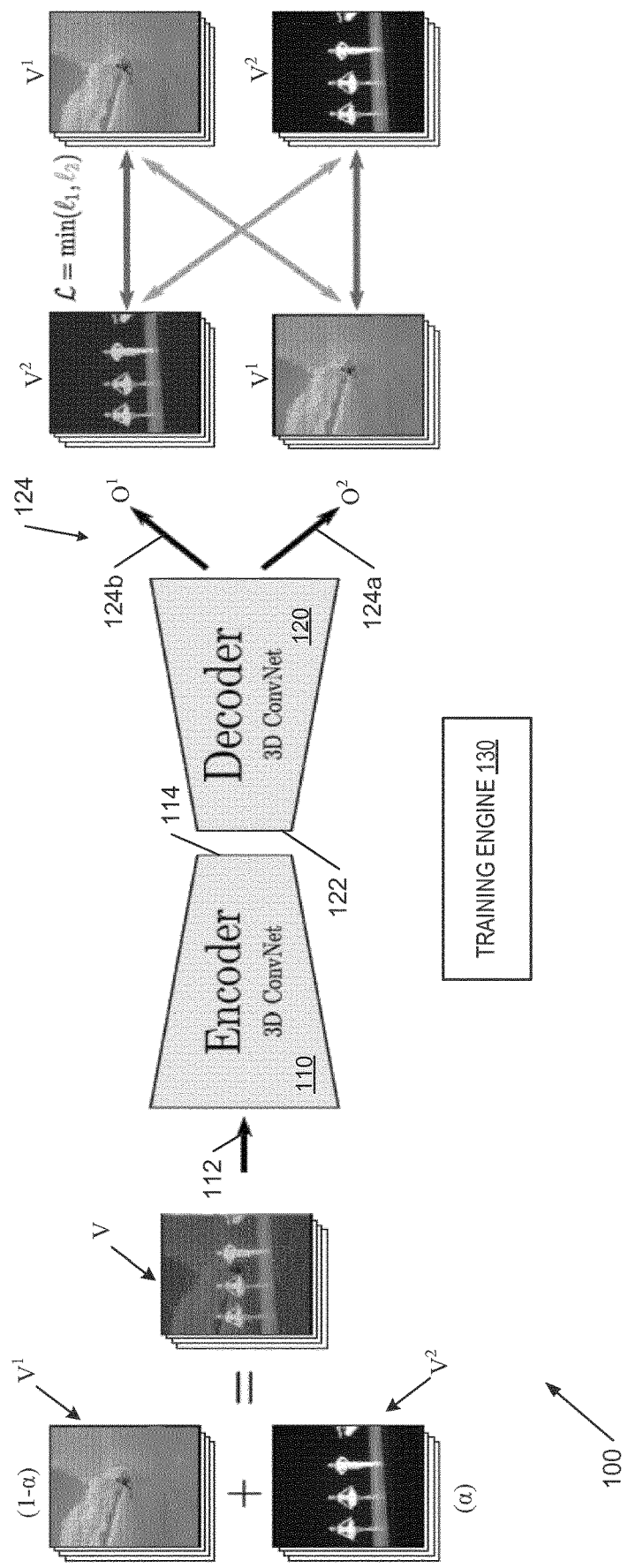
FIG. 1 shows an example neural network system for decomposing input video data.

FIG. 1 shows an overview of such a computer-implemented neural network system 100 for decomposing input video data. The neural network system 100 comprises a 3D spatio-temporal encoder neural network 110 having an input 112 to receive a sequence of input video image frames, and one or more outputs 114 to provide a compressed i.e. encoded representation of the input video image frames. The neural network system 100 further comprises a 3D spatio-temporal decoder neural network 120 having an input 122 to receive the compressed representation of the input video image frames and an output 124 comprising a set of outputs 124a,b each to provide a respective set of decomposed video data. These neural networks are 3D in the sense that they process monochrome or color video data comprising two spatial dimensions and one time dimension.

In implementations the 3D spatio-temporal encoder neural network comprises a 3D convolutional neural network and the 3D spatio-temporal decoder neural network comprises a 3D transposed convolutional neural network. In some implementations the neural network system 100 may be referred to as a predictor neural network system and may followed by a corrector neural network system, as described later.

The neural network system 100 may be trained using synthetically generated training videos. FIG. 1 shows an example of a synthetically generated training video V generated by combining a first video $V^1$ and a second video $V^2$. Each of these videos may comprise a total of T frames with height H, width W and 3 RGB channels and the first and second videos may be combined additively in a ratio $\alpha$ to $(1-\alpha)$ where $\alpha$ is a blending value in the range [0,1], for example according to $V=(1-\alpha)V^1+\alpha V^2$.

In the visual domain reflections combine additively in this way but other features such as shadows and highly specular surfaces do not. Nonetheless it has been found that when the neural network system is trained with a large and diverse set of blended videos it is able to factor out features such as shadows, e.g. because a shadow in one video will tend to darken the blended video.

During training the neural network system 100 may include a training engine 130. The training engine 130 trains the neural network system 100 so that the outputs 124a,b, denoted $O^1$, $O^2$, reconstruct the original video data $V^1$, $V^2$, subject to a permutation. That is, it is not defined which output reconstructs which original training video. Rather than try to enforce a particular output to reconstruct a particular video the neural network system 100 is trained with a training loss which is permutation invariant. For example the loss L may be the minimum of a reconstruction loss $l_1$ for $O^1$ reconstructing $V^1$ and $O^2$ reconstructing $V^2$ and a reconstruction loss $l_2$ for $O^1$ reconstructing $V^2$ and $O^2$ reconstructing $V^1$. The reconstruction loss may comprise any distance metric between the videos, e.g. a per-pixel L1 or L2 loss optionally including a spatial gradient term as described later.

The neural network system 100 may use cues such as different motion fields and semantic content to reconstruct the original videos, as well as more subtle cues such as color and blurring. Surprisingly, therefore, a neural network system of this type, trained with additively blended videos, can perform video decomposition on input video to separate out undesired features and recover a clean video sequence, even though the undesired features may not themselves combine additively with the clean video sequence.

Figure 2:
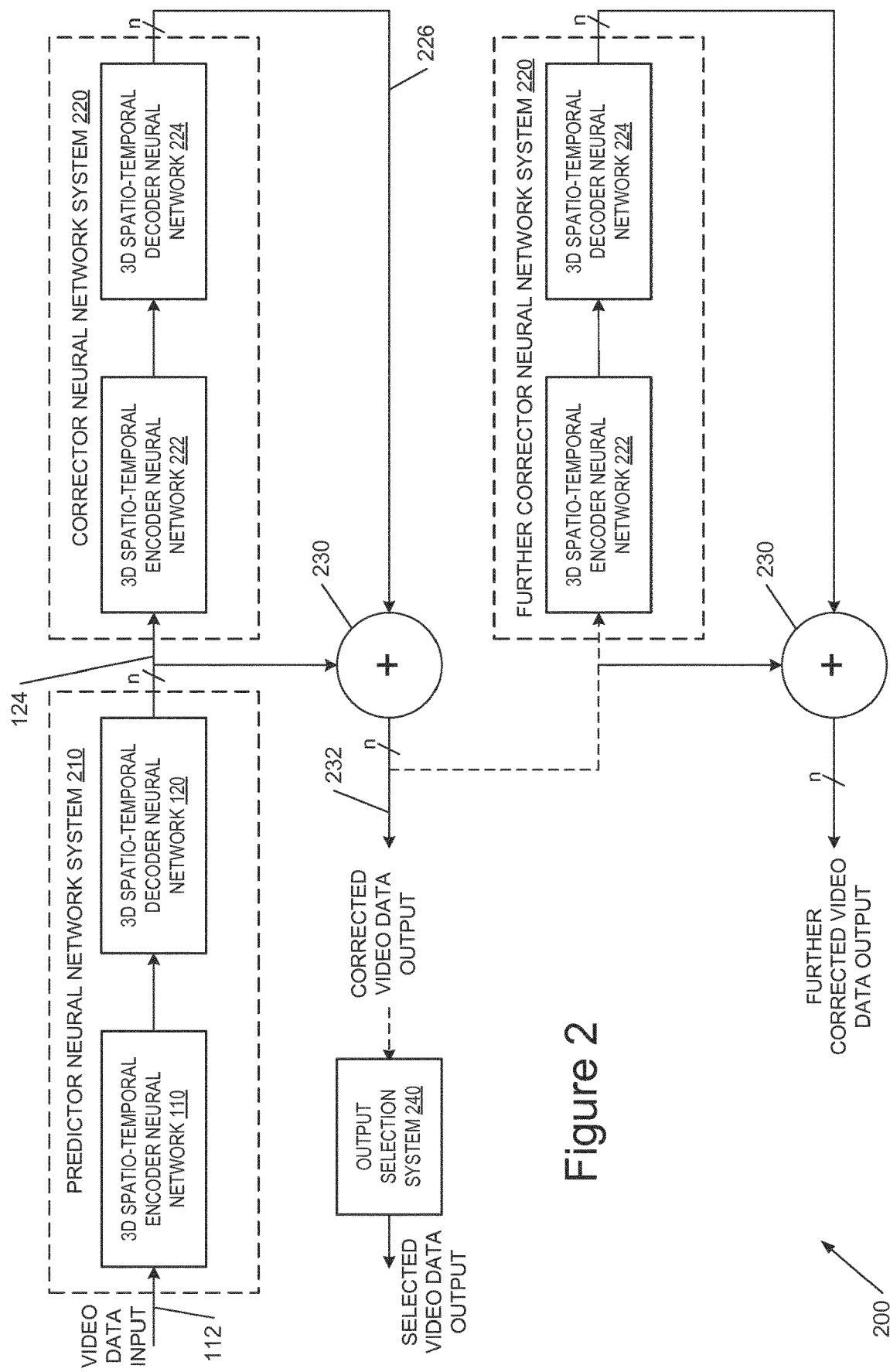
FIG. 2 shows an example of a predictor-corrector neural network system for decomposing input video data.

FIG. 2 shows an example of a predictor-corrector neural network system 200 for decomposing input video data. In FIG. 2 a predictor neural network system 210 comprises first 3D spatio-temporal encoder and decoder neural networks 110, 120 as previously described. The predictor-corrector neural network system 200 also includes a corrector neural network system 220 which comprises a second 3D spatio-temporal encoder neural network 222 and a second 3D spatio-temporal decoder neural network 224, each of which may be respectively similar to the first 3D spatio-temporal encoder and decoder neural networks 110, 120. The decomposed video data outputs 124 of the predictor neural network system 210 provide an input to the corrector neural network system 220, which provides an output 226 comprising correction video data $\Delta$ to the output 124, i.e. a correction for each of the set of outputs 124a,b. The correction is combined, e.g. summed by summer 230, with the output of the predictor neural network system 210, to provide combined i.e. corrected video data 232. Denoting the output 124 of the by $\tilde{O}$, a final output, O, of the predictor-corrector neural network system 200 may be given by $O=\tilde{O}+\Delta$.

In implementations the predictor neural network system 210 and the corrector neural network system 220 do not share weights. The predictor and corrector neural network systems 210, 220 may be trained end-to-end using the process described with reference to FIG. 1 and FIG. 5 later; a two-stage training process is not needed.

The predictor-corrector neural network system 200 of FIG. 2 may be extended as illustrated, by one or more further corrector neural network systems 220 and one or more further summers 230, in a chain to provide a further corrected video data output.

The 3D spatio-temporal decoder neural network 120 of FIGS. 1 and 2 may provide more than two outputs. This is helpful because of inherent uncertainty in the problem of video deconstruction; multiple different decompositions may satisfactorily reconstruct the input, even though only two videos may have been blended for training. Providing more than two outputs allows the 3D spatio-temporal decoder neural network 120 to generate multiple potential decompositions.

To generate n sets of decomposed video data 3D spatio-temporal decoder neural network 120 may be configured to provide n output channels e.g. from a last layer before the output. For example where the input video data has dimension T×H×W×3, the output 124 may have dimension T×H×W×3n defining a set of n decomposed video data outputs, where n may be equal to or greater than 2.

The example implementation of a predictor-corrector neural network system shown in FIG. 2 illustrates a 3D spatio-temporal decoder neural network 120 which provides n outputs; in such a system the 3D spatio-temporal decoder neural network 224 also provides n outputs.

The neural network systems 100, 200 may include an output selection system 240 to automatically select a subset n' of the set of n output channels when decomposing an input video data after training, where n'=1, n'=2, or n'>2. For example the system may be configured to select the n', e.g. two, most dissimilar output channels (video layers) according to a dissimilarity measure. The dissimilarity measure may comprise any distance metric between the sets of decomposed video data, e.g. a per-pixel L1 or L2 loss, optionally including a spatial gradient term.

Experimentally it has been found that predicting more than two layers, by using more than two output channels, can provide substantially better decomposition. That is, two video layers selected from a set of n>2 can provide more accurate un-mixing that when decomposing video into just two layers overall.

Figure 3:
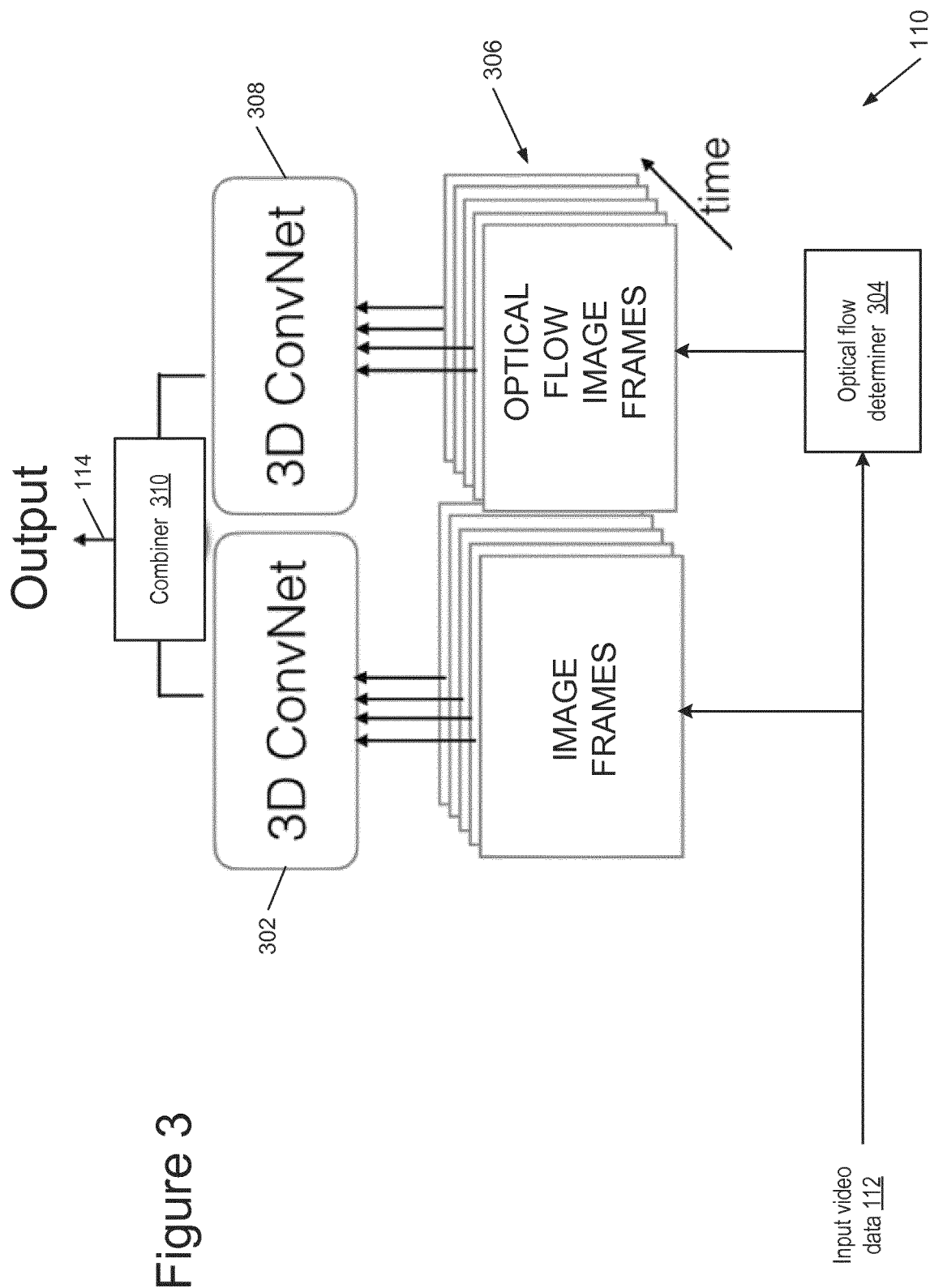
FIG. 3 shows an example 3D spatio-temporal encoder neural network for the neural network systems of FIGS. 1 and 2.

In one example implementation each of the 3D spatio-temporal encoder neural networks 110, 222 may have an I3D architecture, as described in Carreira and Zisserman, arXiv: 1705.07750. Thus FIG. 3 shows an example 3D spatio-temporal encoder neural network 110 based on an I3D architecture, in which the input video data 112 comprising a set (sequence) of T image frames provides an input to a first 3D convolutional neural network 302. The input video data 112 is also provided to an optical flow determiner 304 configured to determine a set of optical flow image frames 306 e.g. from pairs of image frames using any of a range of techniques e.g. a TV-L1 algorithm. The set of optical flow frames 306 provides an input to a second 3D convolutional neural network 308, an output of which is combined e.g. averaged or otherwise linearly combined, with an output of the first 3D convolutional neural network 302 by a combiner 310 to provide the output 114.

Referring back to FIGS. 1 and 2, each 3D spatio-temporal encoder-decoder neural network pair may include one or more skip connections between intermediate neural network layers of the encoder and decoder neural networks, e.g. in a U-Net-type architecture (arXiv:1505.04597).

Figure 4A:
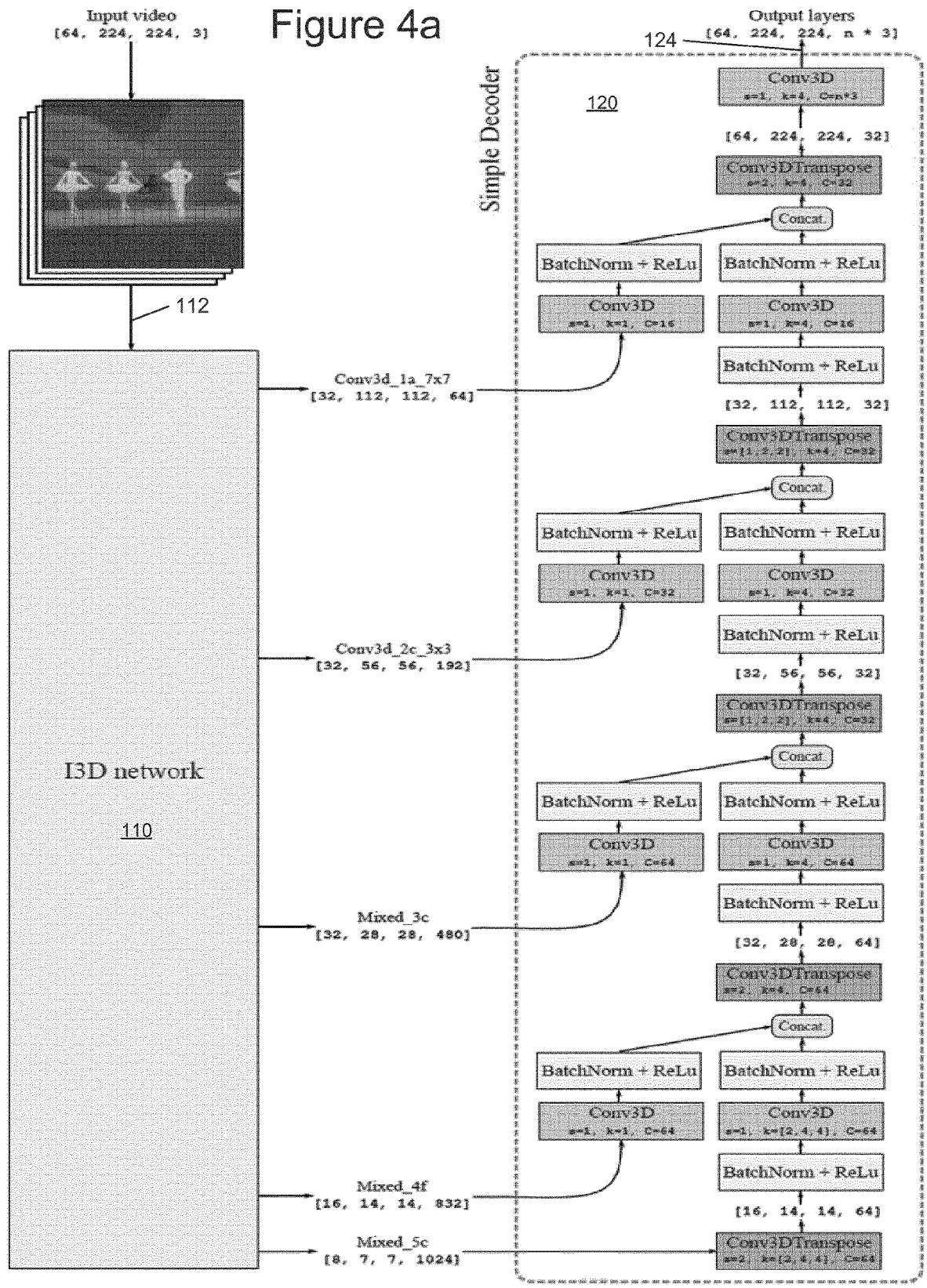
FIGS. 4a-4b show example implementations of the neural network systems of FIGS. 1 and 2 respectively.
Figure 4B:
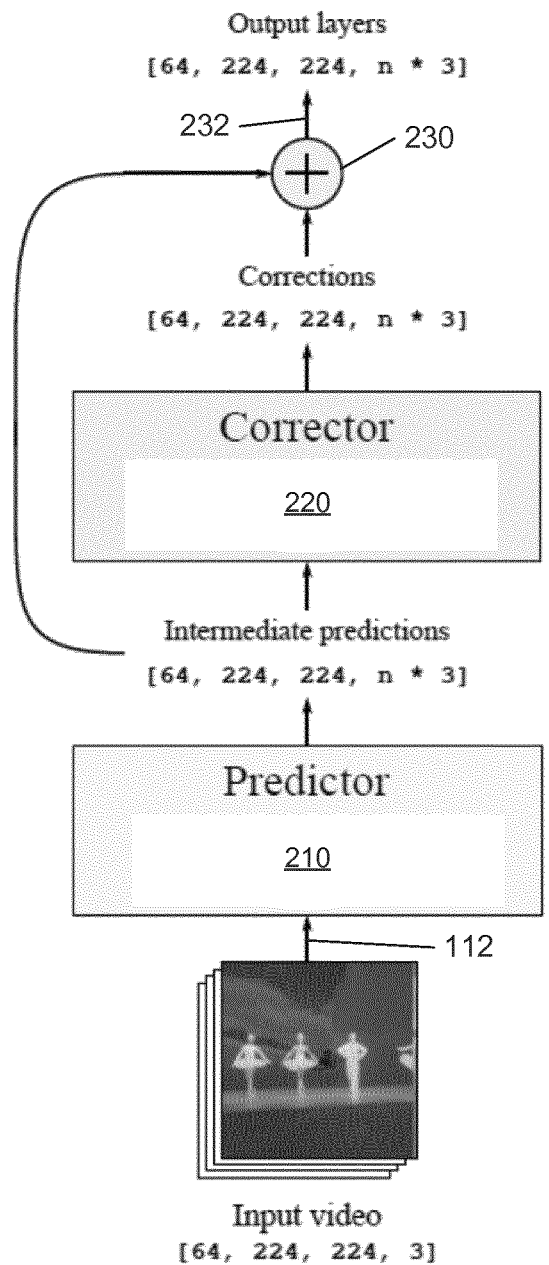

Merely by way of example FIG. 4a shows one possible implementation of the neural network system 100 which comprises 3D spatio-temporal encoder and decoder neural networks 110 with skip connections and a U-Net architecture. In FIG. 4 s=stride, k=kernel shape, c=channels, and n is the number of output channels. The I3D network block is described in the I3D paper (ibid); reference may also be made to the associated code on GitHub. FIG. 4b shows one possible implementation of the predictor-corrector neural network system 200 of FIG. 2.

Figure 5:
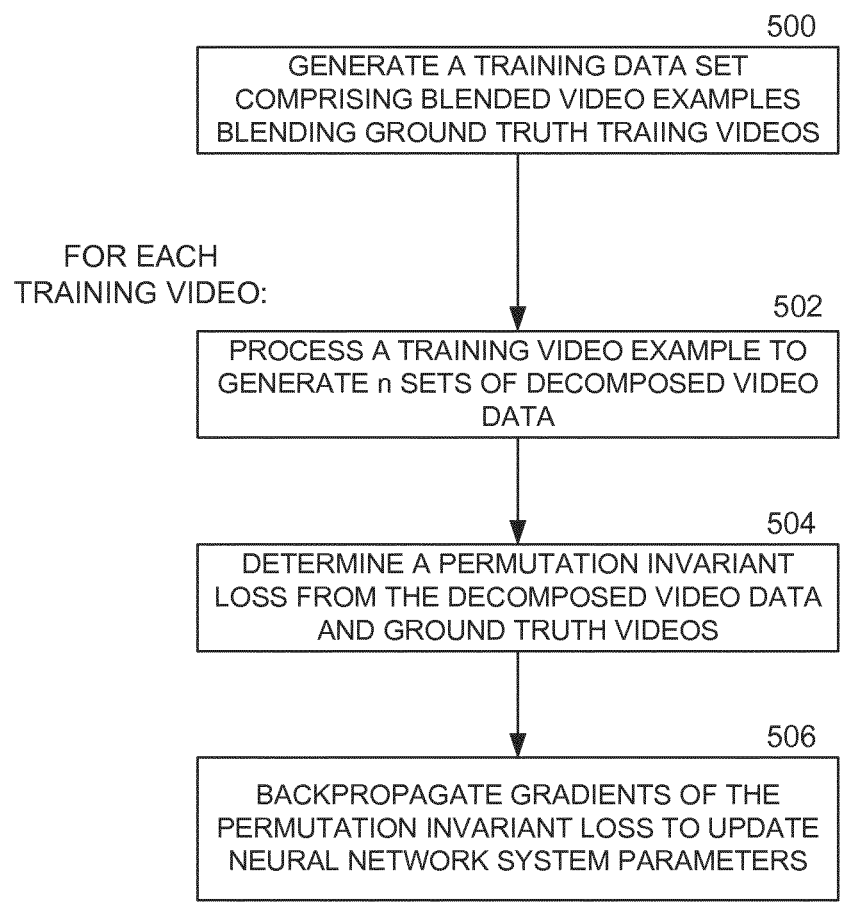
FIG. 5 shows an example process for training the neural network systems of FIGS. 1 and 2.

FIG. 5 shows an example process suitable for training either of the neural network systems 100, 200. The process begins by generating a training data set comprising blended training videos derived from first and second videos as previously described (step 500). The blending value may be varied or fixed at e.g. α=0.5. The training data may be augmented by applying an augmentation process to the training videos e.g. by random left-right flipping and/or random spatio-temporal cropping e.g. by first resizing the training videos to slightly larger than the crop size.

Then each training video in the training data set is processed in turn by the neural network system 100, 200 to be trained, to generate n sets of decomposed video data, where n≥2 (step 502). Each set of decomposed video data defines a respective output video $O^i$ where i=1 . . . n.

The process then determines a permutation invariant loss from the sets of decomposed video data and the ground truth videos $V^1$, $V^2$, i.e. the videos blended to generate the training video. The permutation invariant loss may be defined as:

$$\mathcal{L}(\{V^1, V^2\}, O) = \min_{(i,j)|i \neq j} (l(V^1, O^i) + l(V^2, O^j))$$

where i,j=1 . . . n (i.e. i,j run over all the outputs), and/is a video reconstruction loss as previously described. Thus the permutation invariant loss comprises a reconstruction loss for the two output videos which are most similar to the ground truth videos.

In some implementations the reconstruction loss may include a term representing a difference between spatial gradients in corresponding video image frames. For example the reconstruction loss for two videos U and V may be defined as:

$$l(U, V) = \frac{1}{2T} \left( \sum_t \|U_t - V_t\|_1 + \|\nabla(U_t) - \nabla(V_t)\|_1 \right)$$

where $\nabla(\cdot)$ denotes a spatial gradient operator and $\|\cdot\|_1$ denotes the L1 norm; an L2 norm for either or both terms may be used instead. Differences due to edges in the videos can be harder to distinguish than differences due to approximately constant areas; including a spatial gradient term helps to address this.

Once the permutation invariant loss has been determined, the process backpropagates gradients of this loss to update parameters, e.g. weights of the neural network system (step 506) using any of a range of backpropagation techniques, e.g. with momentum. The process then repeats with the next training video.

Figure 6:
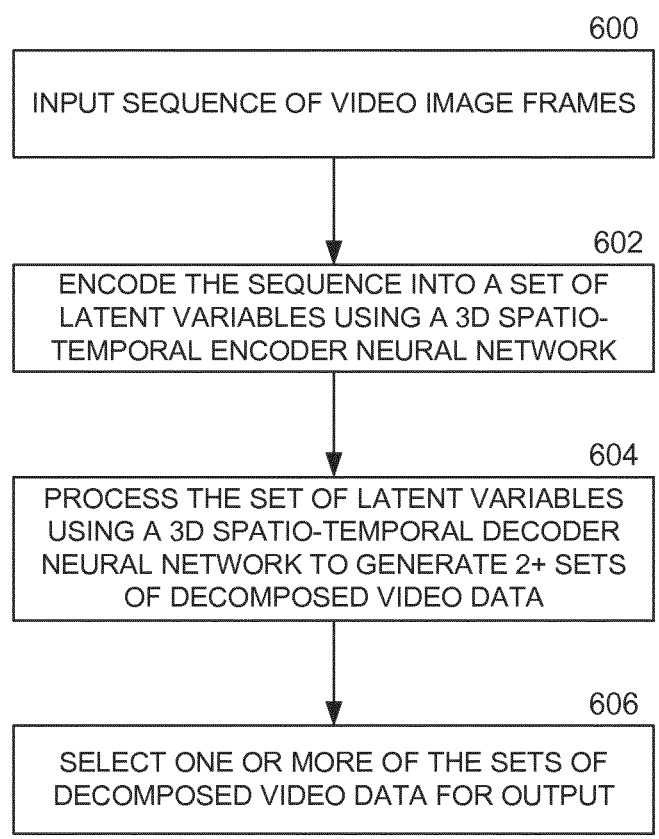
FIG. 6 shows an example process for decomposing a video input using a trained neural network system.

FIG. 6 shows an example process for decomposing a video input using a trained neural network system as described above. The process inputs a sequence of video images (step 600), and encodes the sequence into a set of latent variables using the 3D spatio-temporal encoder neural network 110 (step 602). The set of latent variables is then processed using the 3D spatio-temporal decoder neural network 120 to generate two or more sets of decomposed video data (step 604). The process then selects one or more of these for output (step 606), e.g. as previously described. The output video data may be stored, communicated, and/or made available to a user interface.

Figure 7:
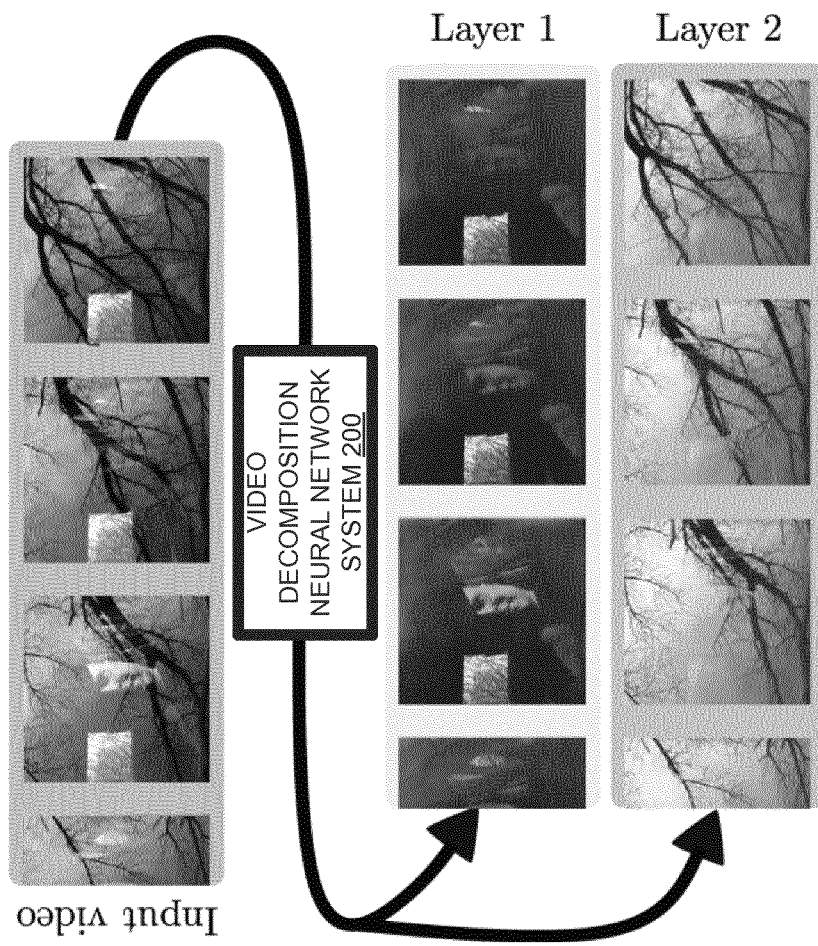
FIG. 7 shows an example video sequence decomposed into two separate video layers.

FIG. 7 shows an example of an input video sequence decomposed in this way, using the neural network system 200, into output video data for two decomposed video sequences, labelled "Layer 1" and "Layer 2". The input video sequence shows a person driving a car with trees reflecting from its windscreen. The two decomposed video layers separate out the interior of the car from the reflected trees.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The typical elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented neural network system for processing input video data representing input video image frames to decompose the input video data into two or more sets of decomposed video data each representing a respective sequence of decomposed video image frames, the sequences of decomposed video image frames representing a decomposition of the input video image frames, the neural network system comprising:
    a video data input to receive a sequence of input video image frames;
    a predictor 3D spatio-temporal encoder neural network to encode the sequence of input video image frames into a first set of latent variables representing a compressed version of the input video image frames;
    a predictor 3D spatio-temporal decoder neural network to receive and process the first set of latent variables to generate two or more sets of decomposed video data representing respective sequences of decomposed video image frames;
    a video data output to output video data derived from one or more of the sets of decomposed video data;
        a corrector 3D spatio-temporal encoder neural network to receive each of the sets of decomposed video data and to encode the respective sequences of decomposed video image frames into a second set of latent variables representing a compressed version of the sequences of decomposed video image frames;
    a corrector 3D spatio-temporal decoder neural network to receive and process the second set of latent variables to generate two or more sets of correction video data, a set of correction video data for each set of decomposed video data; and
    a combiner to combine each set of decomposed video data with a respective set of correction video data to provide two or more sets of combined video data, wherein the video output data comprises one or more of the sets of combined video data.

2. A neural network system as claimed in claim 1 comprising a chain of corrector neural network systems, each corrector neural network system comprising one of the corrector 3D spatio-temporal encoder neural networks coupled to one of the corrector 3D spatio-temporal decoder neural networks, wherein each of the corrector neural network systems is configured to provide a set of correction video data for each set of decomposed video data, and wherein the combiner is configured to combine each set of decomposed video data with a respective set of correction video data from each of the corrector neural network systems.

3. A neural network system as claimed in claim 1 further comprising an optical flow image determination system to determine a sequence of optical flow image frames from the sequence of input video image frames, and wherein the predictor 3D spatio-temporal encoder neural network comprises a pair of convolutional neural networks, a first convolutional neural network to process the sequence of input video image frames and a second convolutional neural network to process the sequence of optical flow image frames; and a combiner to combine outputs from the first and second convolutional neural networks to provide the first set of latent variables.

4. A neural network system as claimed in claim 3 wherein each of the first and second convolutional neural networks comprises a 3D spatio-temporal convolutional neural network.

5. A neural network system as claimed in claim 1 wherein the predictor 3D spatio-temporal encoder neural network and the predictor 3D spatio-temporal decoder neural network each include a plurality of neural network layers, and further comprising one or more skip connections between neural network layers of corresponding resolution in the predictor 3D spatio-temporal encoder neural network and in the predictor 3D spatio-temporal decoder neural network.

6. A neural network system as claimed in claim 1 wherein the predictor 3D spatio-temporal decoder neural network is configured to generate three or more sets of decomposed video data.

7. A neural network system as claimed in claim 6 further comprising an output selection system to select two of the sets of decomposed video data for the output video data.

8. A neural network system as claimed in claim 7 wherein the output selection system is configured to determine a difference metric between the sets of decomposed video data and to select for output the two sets of decomposed video data with the greatest mutual difference metric.

9. A neural network system as claimed in claim 1 wherein the predictor 3D spatio-temporal decoder neural network comprises a 3D de-convolutional neural network with a multichannel output, and wherein the sets of decomposed video data are provided by channels of the multichannel output.

10. A method of processing input video data representing input video image frames to decompose the input video data into two or more sets of decomposed video data each representing a respective sequence of decomposed video image frames, the sequences of decomposed video image frames representing a decomposition of the input video image frames, the method comprising:
receiving a sequence of input video image frames;
encoding the sequence of input video image frames using a predictor 3D spatio-temporal encoder neural network, into a first set of latent variables representing a compressed version of the input video image frames;
processing the first set of latent variables using a predictor 3D spatio-temporal decoder to generate two or more sets of decomposed video data representing respective sequences of decomposed video image frames;
providing output video data derived from one or more of the sets of decomposed video data;
processing each of the sets of decomposed video data using a corrector 3D spatio-temporal encoder neural network to encode the respective sequences of decomposed video image frames into a second set of latent variables representing a compressed version of the sequences of decomposed video image frames;
processing the second set of latent variables using a corrector 3D spatio-temporal decoder neural network to generate two or more sets of correction video data, a set of correction video data for each set of decomposed video data; and
combining each set of decomposed video data with a respective set of correction video data to provide two or more sets of combined video data, wherein the video output data comprises one or more of the sets of combined video data.

11. A method as claimed in claim 10 further comprising processing the sequence of input video image frames using an optical flow image determination system to determine a sequence of optical flow image frames from the sequence of input video image frames, wherein the predictor 3D spatio-temporal encoder neural network comprises a pair of convolutional neural networks, a first convolutional neural network to process the sequence of input video image frames and a second convolutional neural network to process the sequence of optical flow image frames; and a combiner to combine outputs from the first and second convolutional neural networks to provide the first set of latent variables.

12. A method as claim in claim 11 wherein each of the first and second convolutional neural networks comprises a 3D spatio-temporal convolutional neural network.

13. A method as claimed in claim 10 wherein the predictor 3D spatio-temporal encoder neural network and the predictor 3D spatio-temporal decoder neural network each include a plurality of neural network layers, and further comprising one or more skip connections between neural network layers of corresponding resolution in the predictor 3D spatio-temporal encoder neural network and in the predictor 3D spatio-temporal decoder neural network.

14. A method as claimed in claim 10 wherein the predictor 3D spatio-temporal decoder neural network is configured to generate three or more sets of decomposed video data.

15. A method as claimed in claim 14 further selecting two of three or more sets of decomposed video data for the output video data.

16. One or more non-transitory computer storage media storing instructions that when executed by one or more computers cause the one or more computers to perform operations comprising:
receiving a sequence of input video image frames;
encoding the sequence of input video image frames using a predictor 3D spatio-temporal encoder neural network, into a first set of latent variables representing a compressed version of the input video image frames;
processing the first set of latent variables using a predictor 3D spatio-temporal decoder to generate two or more sets of decomposed video data representing respective sequences of decomposed video image frames; and
providing output video data derived from one or more of the sets of decomposed video data, characterized in that the method further comprises:
processing each of the sets of decomposed video data using a corrector 3D spatio-temporal encoder neural network to encode the respective sequences of decomposed video image frames into a second set of latent variables representing a compressed version of the sequences of decomposed video image frames;
processing the second set of latent variables using a corrector 3D spatio-temporal decoder neural network to generate two or more sets of correction video data, a set of correction video data for each set of decomposed video data; and
combining each set of decomposed video data with a respective set of correction video data to provide two or more sets of combined video data, wherein the video output data comprises one or more of the sets of combined video data.

17. A non-transitory computer storage media as claimed in claim 16, the operations further comprising:
processing the sequence of input video image frames using an optical flow image determination system to determine a sequence of optical flow image frames from the sequence of input video image frames, wherein the predictor 3D spatio-temporal encoder neural network comprises a pair of convolutional neural networks, a first convolutional neural network to process the sequence of input video image frames and a second convolutional neural network to process the sequence of optical flow image frames; and a combiner to combine outputs from the first and second convolutional neural networks to provide the first set of latent variables.

* * * * *